J. B. SALISBURY.
DIRIGIBLE HEADLIGHT FOR AUTOMOBILES.
APPLICATION FILED MAY 3, 1916.
1,257,029.
Patented Feb. 19, 1918.
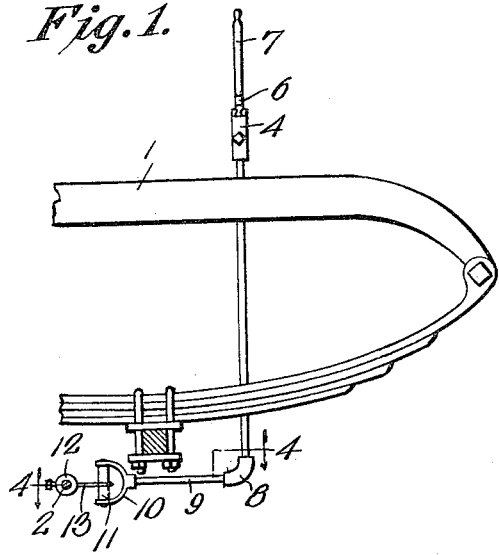
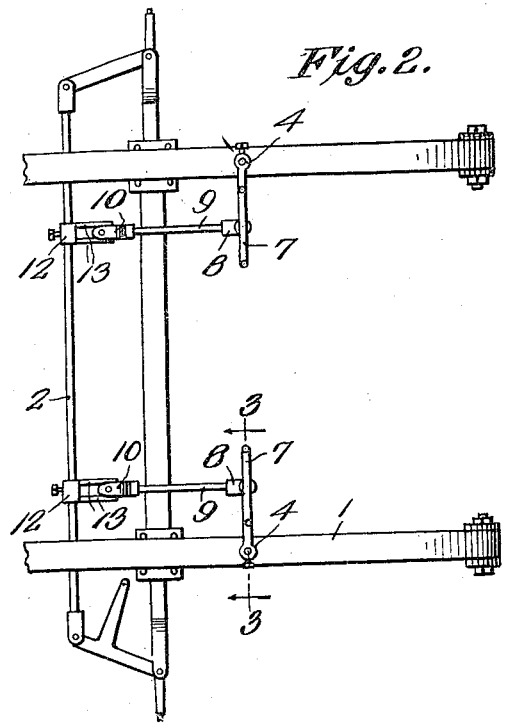
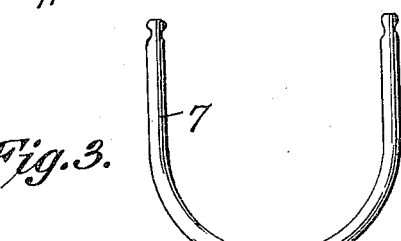
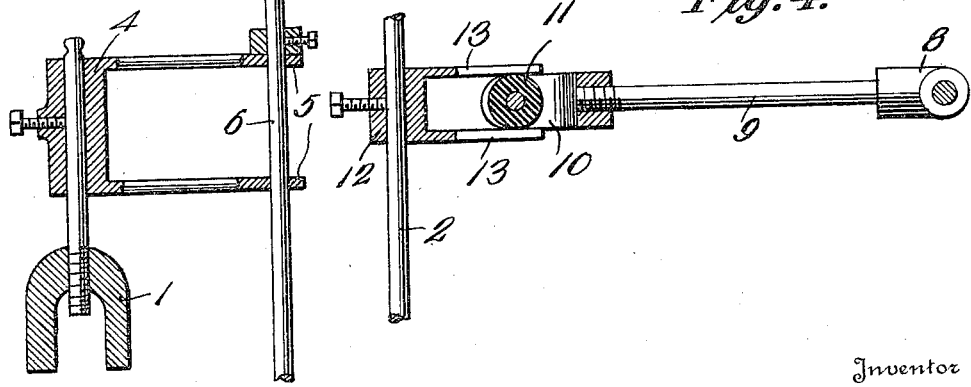
Inventor
J. B. Salisbury,
Attorneys

UNITED STATES PATENT OFFICE.

JOHN B. SALISBURY, OF PHELPS, NEW YORK.

DIRIGIBLE HEADLIGHT FOR AUTOMOBILES.

1,257,029.   Specification of Letters Patent.   Patented Feb. 19, 1918.

Application filed May 3, 1916. Serial No. 95,223.

*To all whom it may concern:*

Be it known that I, JOHN B. SALISBURY, a citizen of the United States, residing at Phelps, in the county of Ontario, State of New York, have invented certain new and useful Improvements in Dirigible Headlights for Automobiles; and I do hereby declare the following to be a full, clear, and exact description of the invention, such as will enable others skilled in the art to which it appertains to make and use the same.

The present invention is directed to improvements in head light supports for automobiles, and has for its object to provide a device of this character which can be quickly attached to an automobile so that the head lights will be turned in the direction in which the automobile is turning.

A further object of the invention is to provide a device of this character which is constructed in such a manner that the lamp will be permitted to turn, but it will not be affected by the motion of the vehicle when traveling over rough ground or obstructions.

With these and other objects in view, this invention resides in the novel features of construction, formation, combination and arrangement of parts to be hereinafter more fully described, claimed and illustrated in the accompanying drawing, in which:—

Figure 1 is a side elevation of a portion of an automobile equipped with the device.

Fig. 2 is a plan view of a portion of the automobile equipped with the device.

Fig. 3 is a sectional view on line 3—3 of Fig. 2.

Fig. 4 is a similar view on line 4—4 of Fig. 1.

Referring to the drawing 1 indicates the frame of an automobile, and 2 the steering rod, both of which being of the conventional form.

On each side of the frame 1 is mounted a bracket 4, said bracket being provided with a pair of vertically spaced eyes 5 and in which is engaged the rod 6, said rod having its upper end provided with the lamp brackets 7. The lower end of the rod 6 is engaged in the elbow 8, said elbow also having engaged therewith a horizontal rod 9 which has its inner end engaged with the fork 10. The fork 10 rotatably supports the roller 11, said roller being preferably formed from rubber so as to prevent any undue noise.

Detachably connected to the steering rod 2 is a clamp 12, said clamp having carried thereby forwardly directed spaced fingers 13, said fingers being adapted to span the roller 11, whereby when the rod 2 is shifted the rods 6 and 7 will be simultaneously shifted so as to turn the head lights in the direction in which the automobile is turning.

From the foregoing description it will be seen that a device of this character has been provided which can be easily and quickly attached to any make of automobile, and when in place thereon the head lights will be operated to cast their rays in the direction in which the automobile is traveling.

What is claimed is:—

1. A mechanism for transforming reciprocatory motion of a steering knuckle reach rod to oscillatory motion of a lamp support, consisting of a rod having at one end lamp-support rigid-connecting means and at its opposite end a prong in which is rotatably mounted an elongated roller with its axis at right angles to the axis of the rod and a clamp having means for holding it upon a reach rod and provided with elongated fingers spaced apart a distance to snugly and rollingly receive the roller between them.

2. A dirigible fixture for an automobile headlight comprising a bracket having vertically spaced arms, a lamp support including a stem rotatably mounted in said arms, a second stem adjustably mounted in the body of the bracket and depending therefrom to engage a chassis frame, a rod having at one end means for rigidly connecting it with the support and at its opposite end having a prong in which is rotatably mounted an elongated roller with its axis at right angles to the axis of the rod, and a clamp having means for holding it upon the reach rod of the steering knuckles of an automobile and provided with elongated fingers spaced apart a distance to snugly and rollingly receive the roller between them.

In testimony whereof, I affix my signature, in the presence of two witnesses.

JOHN B. SALISBURY.

Witnesses:
 HENRY R. WARNER,
 CORNELIUS LOUDEN.